(No Model.)

J. W. MILLER.
GATE.

No. 454,802. Patented June 23, 1891.

WITNESSES:
Donn Twitchell
E. M. Clark

INVENTOR:
J. W. Miller
BY
Munn & Co
ATTORNEYS

UNITED STATES PATENT OFFICE.

JACOB W. MILLER, OF MARION, OHIO, ASSIGNOR OF ONE-HALF TO FREDERICK RETTERER, OF SAME PLACE.

GATE.

SPECIFICATION forming part of Letters Patent No. 454,802, dated June 23, 1891.

Application filed September 3, 1890. Serial No. 363,816. (No model.)

*To all whom it may concern:*

Be it known that I, JACOB W. MILLER, of Marion, in the county of Marion and State of Ohio, have invented a new and useful Improvement in Gates, of which the following is a full, clear, and exact description.

This invention relates to farm-gates which not only swing horizontally to open and close, but are made capable of being raised bodily independently of their swinging motion, to allow hogs, sheep, or other small animals that herd with cattle to pass out beneath the gate without permitting the cattle to pass through the latter.

My invention consists in a novel combination of devices for thus operating the gate, including levers, pulleys, and cord, wire, or chain, arranged so that to raise the gate it is lifted directly against its weight to throw it against the hinge-post, instead of as in other lever, pulley, and cord or chain devices which pull from said post to raise the gate.

Reference is to be had to the accompanying drawings, forming a part of this specification, in which similar letters of reference indicate corresponding parts in both the views.

Figure 1:
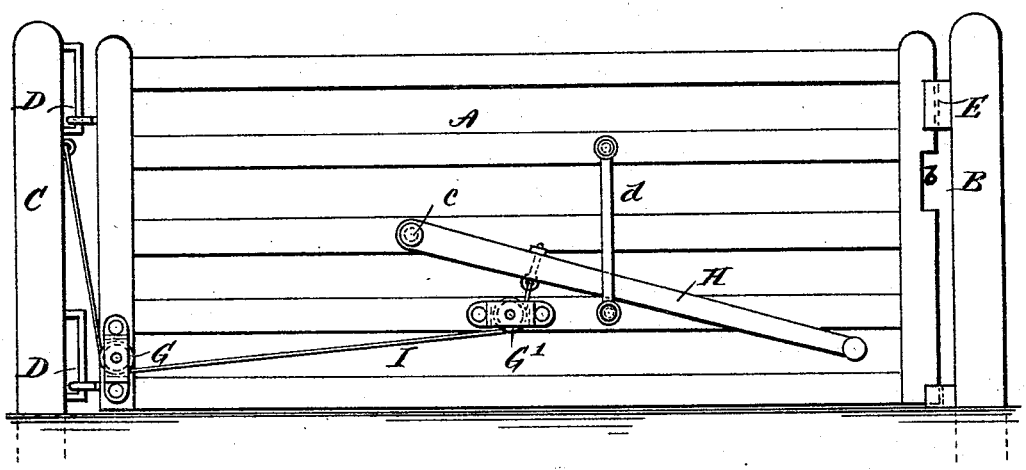
Figure 2:
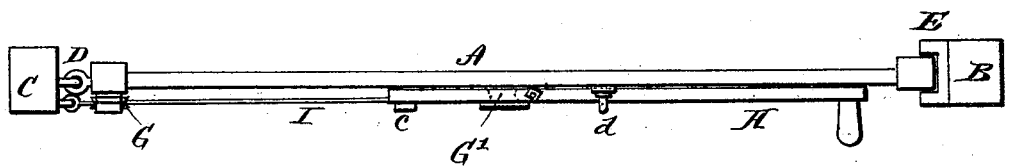

Figure 1 represents a front view of a raising and swinging gate embodying my invention, and Fig. 2 a top view or plan of the same.

A is the gate proper, and B the front and C the back or hinge post. The gate is hinged to the post C by hinges D D, constructed not only to provide for the gate sliding when being raised up on them and within or through a keeper E on the front gate-post B, but also to provide for the gate being swung when so raised till a recess *b* in it clears the keeper in either of opposite directions to open horizontally. The square or straight lift of the gate on its hinges may be either much or little, according to the distance it is required to be raised from the ground to let hogs, sheep, or other small animals that herd with cattle pass under it without swinging the gate horizontally to let the cattle pass through it, or to clear obstacles which would interfere with the swinging of it.

The hinges D D of the gate are composed of long staples—say two feet deep, more or less—secured to the post C, and eyebolts fitted to the back stile of the gate, having freedom to slide up and down said staples, as well as to turn or swing horizontally on them, as other hinges for a like purpose have been made.

I will now proceed to describe the means I employ for bodily or squarely lifting the gate. G G' are two grooved pulleys carried by suitable boxes or frames and secured, respectively, the one G at the lower and back end of the gate near the post C and the other G' at or near the center of the gate on one of the lower longitudinal rails or bars thereof. Pivoted to the gate, as at *c*, above this second pulley G' is the operating-lever H, which has its free or forward end toward the front or opening end of the gate, and which may be arranged to work up and down within a guard *d*. To this lever is attached a wire, cord, or chain I, which passes around and under the pulleys G G', and which is secured at its other end above to the post C. By lifting up on this lever to raise the gate the power is applied to lift directly against the weight of the gate to throw it against the hinge-post C, as distinguished from pulling on said post to raise the gate, thus insuring a free and easy lift. When raised, the lever may be locked or held from falling by any suitable means to keep the gate raised, if desired.

Having thus described my invention, I claim as new and desire to secure by Letters Patent—

The combination, with the posts B C, of the keeper E on the post B, the gate A, hinged to the post C by hinges D, and having its front upright provided with the recess *b*, the operating-lever H, the pulleys G G', secured to the gate, and the cord or chain I, connected to the post C and to the lever H, substantially as herein shown and described.

JACOB W. MILLER.

Witnesses:
JOHN J. CRAWLEY,
FREDERICK RETTERER.